(12) United States Patent
Hohmann et al.

(10) Patent No.: US 6,584,746 B1
(45) Date of Patent: Jul. 1, 2003

(54) MASONRY FLASHING SYSTEM (75) Inventors: Ronald P. Hohmann, Hauppauge, NY (US); Ronald P Hohmann, Jr., Hauppauge, NY (US)

(73) Assignee: Hohmann & Barnard, Inc., Hauppauge, NY (US)

( * ) Notice: Subject to any disclaimer, the term of this patent is extended or adjusted under 35 U.S.C. 154(b) by 0 days.

(21) Appl. No.: 10/143,484

(22) Filed: May 10, 2002

(51) Int. Cl.⁷ ............................... E04C 1/40
(52) U.S. Cl. ................. 52/513; 52/61; 52/62; 52/383; 52/302.6; 428/295.1; 428/297.1; 428/297.4
(58) Field of Search ............... 52/61, 62, 513, 52/383, 302.1, 302.6; 156/40; 428/297.4, 295.1, 297.1

(56) References Cited

U.S. PATENT DOCUMENTS

| | | | |
|---|---|---|---|
| 4,239,795 A | 12/1980 | Haage et al. | 428/60 |
| 4,295,911 A | 10/1981 | Haage et al. | 156/315 |
| 4,686,803 A * | 8/1987 | Couderc et al. | 52/97 |
| 4,755,409 A | 7/1988 | Harkness | 428/40.3 |
| 4,775,567 A | 10/1988 | Harkness | 428/40.3 |
| 4,910,931 A | 3/1990 | Pardue, Jr. | 52/169.5 |
| 5,106,447 A | 4/1992 | Di Rado et al. | 156/334 |
| 5,634,310 A * | 6/1997 | Hohmann | 52/513 |
| 5,860,259 A | 1/1999 | Laska | 52/302.3 |
| 5,870,864 A | 2/1999 | Snyder | 52/169.5 |
| 6,035,582 A | 3/2000 | Pacific | 52/58 |
| RE36,676 E * | 5/2000 | Sourlis | 52/513 |
| 6,167,660 B1 * | 1/2001 | Sama | 52/61 |
| 6,224,700 B1 | 5/2001 | Oakley | 156/71 |

OTHER PUBLICATIONS

US Publication No. 2002/0106491 A1 Aug. 2002 Kobayashi et al.*
ASTM SPEC.D4434–96–PVC Sheet Roofing—www.astm.org/.../D4434.htm.
Laska, W;*Why extending flashing is critical*, Masonry Construction, Dec. 1997; pp. 675–677.
Laska, W; *Proper drainage for weep holes*, Masonry Construction, Aug. 1992; pp. 313–317.
Beall, C; *Installing weep holes*, Masonry Construction, Apr. 1991; pp. 138–139.
DuPont—Product Information—ELVALOY® Kee—Reorder No. H–58365–2—Dtd. 1/99.
Adhesive Products Company, Technical Data Sheet for APC #915 Hot Melt Adhesive, Dated Jan. 2001.
Hohmann & Barnard, Textroflash Data Sheet, H&B, Inc. Dated 1999.
Hohmann & Barnard, Textroflash Installation Instruction –. H&B, Inc. Dated 1999.
Hohmann & Barnard, Accessory Items, Sweet's 04082 HOH—BuyLine 1823; 3 sheets—Dated 1999.

* cited by examiner

*Primary Examiner*—Carl D. Friedman
*Assistant Examiner*—Nahid Amiri
(74) *Attorney, Agent, or Firm*—Siegmar Silber, Esq.

(57) ABSTRACT

A masonry flashing system is disclosed which includes a laminate for flashing cavity walls and a hot melt adhesive composition for coating the surface of the laminate. The adhesive is selected for compatibility with a peel-and-stick installation and, thus, upon pressure activation, when the laminate with hot melt adhesive thereon is pressed against the rough surface of the masonry block, a durable bond is created. The laminate is a polymeric substate formed in part from a mixture of polyvinyl chloride and ethylene acetate carbon monoxide terpolymer and is reinforced by an embedded fibrous mat—either woven or non-woven.

The system also includes a stainless steel drip plate with a hot melt adhesive coating. The drip plate adhesive coating enables the installer to accurately position the plate during construction and maintain the alignment thereof. Optionally, a foam layer is placed on the lower surface of the drip plate so as to improve the sealing of the drip plate to the brick veneer.

15 Claims, 4 Drawing Sheets

MASONRY FLASHING SYSTEM

BACKGROUND OF THE INVENTION

1. Field of the Invention

This invention relates to an improved flashing system for cavity wall structures, and more specifically for walls in which the inner wythe is masonry block and the outer wythe is brick.

2. Description of the Prior Art

In the past, investigations relating to cavity-based flashing systems for brick veneer masonry construction have demonstrated the advantages of surface-mounted flashing. While the technological strides have been made in flashing materials and in peel-and-stick technology, there still remain several areas where continued development is ongoing.

The inventors' patents and their assignee's product line are all related to accessories for cavity wall structures and include insulation, and anchoring and seismic devices, and are sold under the trademarks of Seismiclip®, Byna-Tie®, and DW-10-X®. These products, which are manufactured by Hohmann & Barnard, Inc., Hauppauge, N.Y. 11788, have become widely accepted in the industry and have provided the inventors with particular insight into the technological needs of this marketplace.

Masonry walls with brick veneer are designed with an inner and an outer wythe and a cavity therebetween. The masonry block inner wythe and insulation thereon isolates the interior of the building from the environment, while the brick veneer outer wythe provides an aesthetic finish to the building. The walls of a building are constructed to exclude water and water vapor from the interior. Since the presence of excessive levels of water or water vapor in the cavity hastens the deterioration of building materials, various masonry flashing systems have been proposed.

Because of widespread usage and familiarity with bituminous and asphaltic products in roofing applications, when masonry flashing systems were first designed, the building construction industry adopted the familiar copper and asphalt products. At that time the technology of pressure-sensitive hot melt adhesives needed for peel-and-stick applications was insufficiently developed. Some critics indicated that the adhesive quality was insufficient for the rough masonry block surfaces. Because of the presence of plasticizers, others were apprehensive about the available hot melt adhesives meeting the requisite fire retardancy standards. Also, to provide fire retardancy, some pressure-sensitive products were marketed for building construction use with inorganic fillers, such as alumina trihydrate, antimony oxide or calcium carbonate. However, these filled pressure-sensitive products had disadvantages, such as application problems, phase separation, toxicity, and reduced adhesion upon activation.

Prefabricated peel-and-stick flashing materials have been proposed, such as those shown in Harkness, U.S. Pat. No. 4,775,567 (see infra). These materials have included layers of bitumen and of compound bitumen for adhering the materials to the exteriors of masonry walls. While, under ideal circumstances, these peel-and-stick materials were easy to apply, the patent literature indicates that these materials did not conform well to irregular surfaces. Thus, the prior art bitumens used to secure these flashing materials to masonry walls often lacked the tackiness to bond tightly and durably to the wall surfaces. On occasion, when circumstances were not ideal, the bituminous materials drooled marring the aesthetics of the brick veneer.

Despite these early efforts, developing the right combination of materials and methods for flashing cavity walls in a fast and efficient manner has proved elusive. In addition to the above described technical problems, because there is frequently a delay between erecting the inner wythe and the outer wythe, the flashing installed in the inner wythe is often exposed to substantial ultra-violet radiation. Thus, standards similar to ASTM Specification D4434-96 for polyvinyl chloride sheet roofing need to be met by masonry flashing systems.

In preparing for this application the following patents came to the attention of the inventors and are believed to be relevant to the further discussion of the prior art:

| U.S. Pat. No. | Inventor | Issue Date |
| --- | --- | --- |
| 6,224,700 | Oakley | May 1, 2001 |
| 6,035,582 | Pacific | Mar. 14, 2000 |
| 5,870,864 | Snyder | Feb. 16, 1999 |
| 5,860,259 | Laska | Jan. 19, 1999 |
| 4,910,931 | Pardue | Mar. 27, 1990 |
| 4,775,567 | Harkness | Oct. 4, 1988 |
| 4,775,409 | Harkness | Jul. 5, 1988 |
| 4,295,911 | Haage et al. | Oct. 20, 1981 |
| 4,239,795 | Haage et al. | Dec. 16, 1980 |

Oakley—U.S. Pat. No. 6.224,700—Issued May 1, 2001

Oakley in U.S. Pat. No. 6,224,700 (assigned to Mar-Flex Systems, Inc., Middletown, Ohio) describes a method of applying a composite material to an above-grade building component to form a tacky non-swelling elastomeric membrane. Thereafter, a flexible, non-porous polymeric sheet is pressed onto the tacky exterior of the elastomeric membrane. The polymeric sheet is stronger than the elastomeric membrane and protects the elastomeric membrane from punctures or tears. Here, in situ construction is both labor intensive and requires special equipment for installation.

Pacific—U.S. Pat. No. 6,035,582—Issued Mar. 14, 2000

Pacific describes a flashing material which includes a sheet layer of copper, aluminum or other metal or a thin sheet of unreinforced plastic. Here it appears that in situ adhesives are applied.

U.S. Pat. No. 5,870,864—Snyder—Issued Feb. 16, 1999

Snyder describes a drainage system employing water collection pans which for insertion into the interior cavities of masonry block units over the length of a selected block wall course for collecting the water drained through the interior cavities of the upper courses and directing water to the exterior of the wall.

U.S. Pat. No. 5,860,259—Laska—Issued Jan. 19, 1999

Laska describes an insulated drainage panel for use in cavity wall or veneer wall construction which panel includes a planar insulating board with a porous structure thereof.

U.S. Pat. No. 4,910,931—Pardue—Issued Mar. 27, 1990

In the Pardue patent, a water collection and drainage system is described for a masonry block wall having bond beam block courses and intervening standard block courses. A system of upper water collection pans is supported along each upper bond beam course. Downspouts leading from drain openings in the upper collection pans drain collected from the pans through the vertical block cavities in lower block courses to the next lower series of collection pans. The lowermost bond beam course supports a series of base collection pans which collect water drained through the vertical block cavities from the upper collection pans. Weeping spouts lead laterally from the base collection pans to the exterior of the wall to continuously drain collected water from the interior wall cavities.

U.S. Pat. Nos. 4,775,567 and 4,775,409—Harkness—Issued Oct. 4,1988 and Jul. 5, 1988, Respectively.

A waterproofing laminate suitable for use in roofs, floors or other surfaces where waterproofing is desired contains a reinforcing sheet, first and second bitumen layers secured to opposite surfaces of the reinforcing sheet, first and second compound bitumen layers secured to the bitumen layers, an elastomeric sheet secured to the first compound bitumen layer and a release sheet secured to the second compound bitumen layer. Certain preferred materials for use in the laminate are recited.

U.S. Pat. Nos. 4,295,911 and 4,239,795—Haage et al.—Oct. 20, 1981 and Dec. 16, 1980, Respectively.

A protective covering for the protection of surface seals against mechanical damage in building constructions and other civil engineering constructions which comprises a composite of an elastic, waterproof thermoplastic synthetic resin film sheet and/or synthetic resin layer and a lattice-like fabric having knot couplings or points of intersection of the threads that yield under the effect of a load.

The use of a masonry flashing system of this invention includes a polymeric membrane with hot melt adhesive thereon, release paper, and drip plates for brick veneer facing, as described infra, has also been found to obviate the difficulties discussed and provides other advantages set forth herein.

SUMMARY

In general terms, the masonry flashing system disclosed hereby includes a laminate for flashing which is particularly applicable to cavity walls such a wall with an inner wythe of masonry block and an outer wythe or veneer of brick. The masonry flashing system also includes a hot melt adhesive which coats a surface of the laminate. The adhesive is selected for compatibility with a peel-and-stick installation and, thus, upon pressure activation, when, for instance, the laminate with hot melt adhesive thereon is pressed against the rough surface of the masonry block, a durable bond is created. The laminate is constructed on a polymeric substate which in large part is a mixture of polyvinyl chloride and ethylene acetate carbon monoxide terpolymer. For purposes of improving puncture and tear resistance, a fibrous mat—either woven or non-woven—is embedded under a second elastomeric layer or cover.

Other components of the system include a stainless steel drip plate with a hot melt adhesive coating and a termination bar. The drip plate adhesive coating enables the installer to accurately position the plate and, during construction, maintain the alignment thereof. Optionally, a foam layer is placed on the lower surface of the drip plate so as to improve the sealing of the drip plate to the brick veneer.

The peel-and-stick technology shown herein enables quick and sure flashing of cavity walls which was unavailable prior to the advances in the materials of both elastomeric membranes and hot melt adhesives. The detailed description of these materials is provided hereinbelow.

OBJECTS AND FEATURES OF THE INVENTION

It is an object of the present invention to provide in a masonry flashing system for cavity wall construction, a polymeric membrane with hot melt adhesive thereon which upon pressure activation strongly adheres to the rough and porous surfaces of masonry block and brick.

It is another object of the present invention to provide in a masonry flashing system for cavity wall construction, a polymeric membrane free of bituminous or asphaltic coatings, which membrane resists tearing and puncturing.

It is yet another object of the present invention to provide labor-saving masonry flashing system which utilizes peel-and-stick components that are easy and economical to install in cavity wall constructs having a masonry block inner wythe and a brick outer wythe.

It is still yet another object of the present invention to provide a masonry flashing system which operates cooperatively with present flashing accessories such as mortar guards and weep hole fittings.

It is a feature of the present invention that the hot melt adhesive hereof is compatible with flashing membranes containing ketone ethylene ester.

It is another feature of the present invention that the polymeric membrane hereof is highly, ultra-violet resistant and the membrane includes an embedded woven or non-woven fiber layer to enhance tear and puncture resistance.

It is yet another feature of the present invention that the drip plate optionally has hot melt adhesive portion thereon to assist in aligning the drip plate during the installation of the outer wythe.

Other objects and features of the present invention will become apparent upon reviewing the drawing and reading the detailed description which follows.

BRIEF DESCRIPTION OF THE DRAWINGS

In the following drawings, the same parts in the various views are afforded the same reference designators.

DESCRIPTION OF THE PREFERRED EMBODIMENTS

In the masonry flashing system of this invention, hot melt adhesives are used to attach the polymeric flashing body to the cavity face of the masonry inner wythe. This is emplaced behind the insulation which serves to protect against weather, to reduce sound, to stop water vapor from condensing on the colder surfaces.

Figure 1:
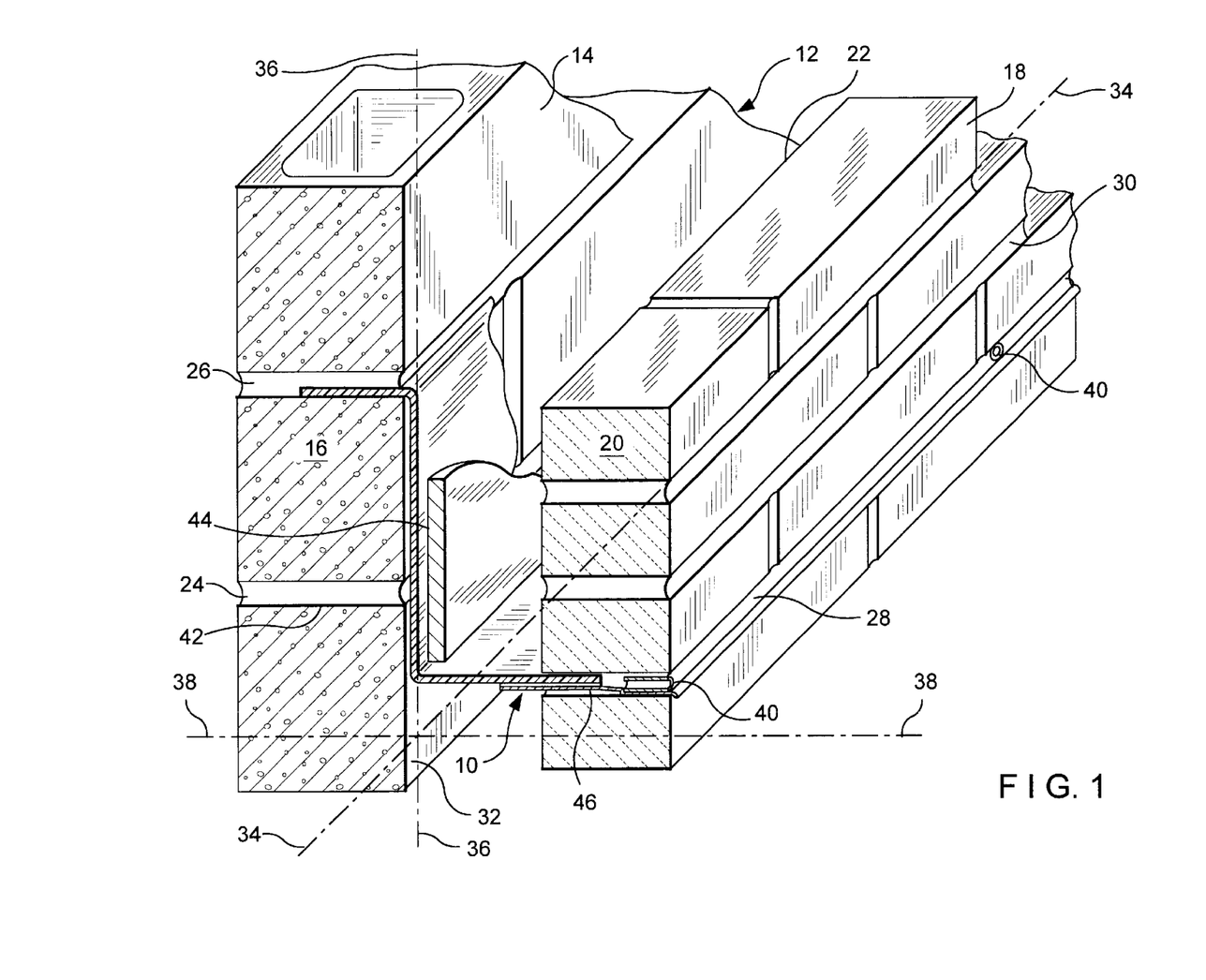
FIG. 1 is a perspective view of a first embodiment of a masonry flashing system of this invention and shows a wall with an interior wythe of masonry block and an exterior wythe of brick having a through-wall flashing system installed therein.
Figure 2:
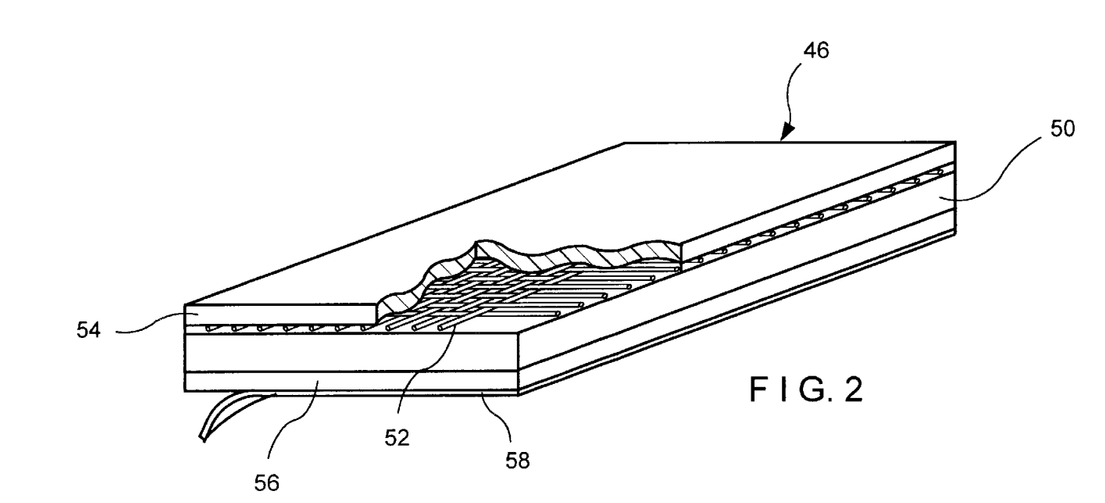
FIG. 2 is a perspective view of the uninstalled peel-and-stick flashing membrane of FIG. 1 with successive laminae partially broken away to show details of the structure thereof.
Figure 3:
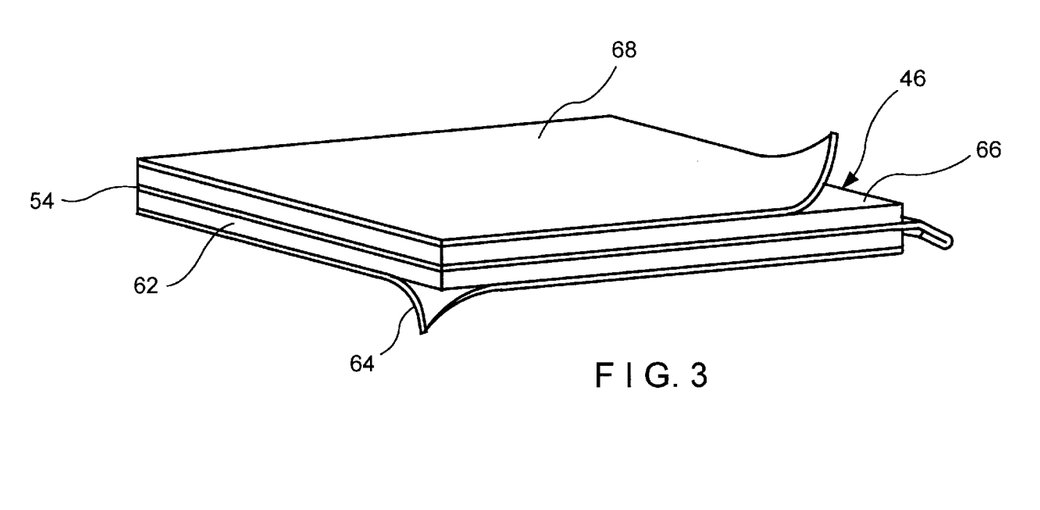
FIG. 3 is a perspective view of the uninstalled peel-and-stick drip plate of FIG. 1 with successive laminae partially broken away to show details of the structure thereof.

Referring now to FIGS. 1 through 3, a perspective view of the first embodiment of this invention in which a masonry flashing system, referred to generally by the reference designator 10, is shown. In this embodiment, a cavity wall structure 12 is shown having an inner wythe 14 of masonry blocks 16 and an outer wythe 18 of facing brick 20. Between the inner wythe 14 and the outer wythe 18, a cavity 22 is formed. Successive bed joints 24 and 26 are formed between courses of blocks 16 and the joints are substantially planar and horizontally disposed. Also, successive bed joints 28 and 30 are formed between courses of bricks 20 and the joints are substantially planar and horizontally disposed. Selected bed joint 24 and bed joint 28 are constructed to align, that is to be substantially coplanar, the one with the other.

For purposes of this discussion, the exterior surface 32 of the interior wythe 14 contains a horizontal line or x-axis 34 and an intersecting vertical line or y-axis 36. A horizontal line or z-axis 38 also passes through the coordinate origin formed by the intersecting x- and y-axes. In the discussion which follows, it will be seen that the masonry flashing system 10 of this invention is constructed to completely seal the cavity, to drain water therefrom and to permit air and water vapor to enter and exit through weep holes 40 that are in communication the masonry flashing system 10.

Across the cavity 22, in this embodiment, a through-the-wall installation of the masonry flashing system is shown. The system 10 includes a polymeric membrane or a composite elastomeric sheet 42 constructed for embedment in bed joint 24 in an x-z plane, for adherence to surface 32 in an x-y plane, for extending across and into bed joint 28 thereby sealing cavity 22, and for embedment in bed joint 28 in another x-y plane. In this preferred mode, it is seen that the polymeric membrane 42 is installed behind insulation 44. Between the membrane 42 and the brick 20, a drip plate 46, preferably of stainless steel, is constructed to improve the communication between the masonry flashing system 10 and weep holes 40.

Referring now to FIG. 2 the peel-and-stick polymeric membrane 42 is shown in greater detail. The membrane 42 is comprised of a first elastomeric sheet or carrier 50 upon which is disposed a fibrous mat 52. The fibrous mat 52 is constructed to enhance the tear and puncture resistance of the overall composite. The fibrous mat 52 may be a woven or nonwoven technical textile or may be filaments randomly arranged upon membrane 42. In this embodiment, a second elastomeric sheet 54 is disposed on the fibrous mat 52 sandwiching and sealing the laminae together.

In general, it is preferred that the elastomeric sheets 50 and 54 contain at least one material selected from the group consisting of ethylenepropylene diene monomer, polyisobutylene, chlorinated polyethylene, natural rubber, polyvinyl chloride, ethylene vinyl acetate, and chlorosulfonated polyethylene. A specifically preferred formulation for the elastomeric sheet includes about 10 to 40 percent by weight of unplasticized polyvinyl chloride, and about 10 to 40 percent by weight of an ethylene vinyl acetate carbon monoxide terpolymer. The elastomeric sheet may also contain up to about 15 percent of primary or secondary plasticizer with, or without, up to about 10 percent of processing aids or stabilizers.

In the elastomeric sheets 50 and 54 the amount of polyvinyl chloride is preferably in the range of about 20 to 30 percent by weight of the entire composition and may advantageously be provided as a suspension or emulsion grade of polyvinyl chloride. The ethylene vinyl acetate carbon monoxide terpolymer may contain about 15 to 85 percent ethylene, about 5 to 60 percent vinyl acetate, and about 0.5 to 30 percent carbon monoxide, all on a weight basis. A suitable terpolymer for use in this context is that marketed by E. I. du Pont de Nemours & Company under the trademark Elvaloy, with the preference being for Elvaloy 742.

Referring again to FIG. 2, the peel-and-stick polymeric membrane 42 further includes a hot melt adhesive layer 56 which is formulated for pressure activation and compatibility with a release sheet 58 adhered thereto. The adhesives described herein are particularly useful for peel-and-stick applications in building construction industry as such adhesives are readily pressure activated after the release paper is removed. The adhesive is formulated so that, in case of fire, the coatings thereof will not contribute to smoke or accelerate flame spreading and thus do not require inorganic fillers which are known to interfere with the adhesive function. Also, the adhesives are formulated to have sufficient tackiness so that a durable bond between the membrane and the rough and porous surface of the masonry block is experienced.

Incorporating by reference the Di Rado et al. patent, U.S. Pat. No. 5,106,447, the hot melt adhesive compositions of hot melt layer 56 may be prepared from 10 to 50 weight percent of an isotactic thermoplastic polybutene-1/ethylene copolymer containing from about 5.5 to about 10% by weight ethylene (polybutylene); 20 to 50 percent of a tackifier; 15 to 50 percent of an amorphous diluent having a softening point greater than 90 degrees C.; 0 to 2 percent of a stabilizer; and 0 to 5 percent wax.

The polybutylene copolymers employed herein are copolymers of polybutene-1 and ethylene wherein the ethylene content varies from about 5.5 to about 10% by weight of the copolymer. The applicable isotactic polybutylenes are relatively rigid while in their plastic form but flow readily upon being heated. Expressing molecular weight in terms of melt index, the applicable isotactic polybutylenes to be used in the present adhesive should exhibit a melt index in the range of from about 5 to 2000 dg/min and preferably from 400 to 700 dg/min. The latter melt flow values are determined by the method described in ASTM D1238 and are inversely related to molecular weight, i.e., the lower the melt index, the higher the molecular weight. These copolymers are available from Shell Chemical Company under the Duraflex trademark as Duraflex 8310, 8410, 8510 and 8910, with the 8910 having a melt index of about 700, a grade preferred for use herein. Mixtures of these copolymers may also be used.

The tackifying resins which may be used to extend the adhesive properties of the isotactic polybutylene include: (1) hydrogenated wood rosin or rosin ester; (2) polyterpene resins having a softening point, as determined by an ASTM method E28-58 T, of from about 80 degrees C. to 150 degrees C., the latter polyterpene resins generally resulting from the polymerization of terpene hydrocarbons in the presence of Friedel-Crafts catalysts at moderately low temperatures and including the latter resins which are aromatically modified; examples of commercially available resins of this type being the Nirez resins sold by Reichhold Chemical, the Zonatac resins sold by Arizona, and the Piccolyte S-10, S-25, S-40, S-85, S-100, S-115, S-125 and S-135 resins as sold by Hercules Chemical; (3) aliphatic petroleum hydrocarbon resins having a Ball and Ring softening point of from about 80 degrees C. to 160 degrees C., resulting from polymerization of monomers consisting primarily of 5 carbon atom olefins and diolefins, and including the latter resins which are aromatically modified, examples of commercially available resins of this type being Wingtack 95 and Wingtack Extra as sold by the Goodyear Tire and Rubber Company and the Escorez 1000 series of resins sold by the Exxon Chemical Corporation; and (4) partially and fully hydrogenated hydrocarbon resins such as Resin H-130 from Eastman, Escorez 5000 series from Exxon, and Regalrez from Hercules. The amorphous diluents which are needed and present in the adhesive composition include (atactic) amorphous polypropylene or other similar high softening point (i.e. greater than 90 degrees C.), low crystalline diluent, (e.g. amorphous polyalphaolefins). These diluents, are used at levels of 20 to 50% by weight, preferably about 20 to 25% by weight.

To test the degree of tackiness of the above-described flashing structure, a pull test is performed. An Elvaloy 742 (see paragraph 040 above) 8-inch by 12-inch sample is coated with a hot melt adhesive, namely, APC #915, manufactured by Adhesive Products Company, Indianapolis, Ind. 46235 which hot melt adhesive formulation includes one or more of the aforementioned tackifying resins. A suitable release paper is applied thereover. After a prescribed cure period, the release paper is removed and the flashing of this invention is applied to the surface of a concrete block. The application to the concrete block is at room temperature utilizing a hand-operated laminating roller to provide the pressure activation. A spring scale is then attached to the masonry flashing and a 65 lb. force is required to peel the flashing from the block. Repeating the test for SBS-modified, peel-and-stick flashing, a force of 27 lb. (max.) is required to peel the flashing from the block.

Among the applicable stabilizers or antioxidants utilized herein are included high molecular weight hindered phenols and multifunctional phenols such as sulfur and phosphorous-containing phenols. Representative hindered phenols include: 1,3,5-trimethyl 2,4,6-tris (3,5-di-tert-butyl-4-hydroxy-benzyl)benzene; pentaerythrityl tetrakis-3 (3,5-di-tert-butyl-4-hydroxyphenyl) propionate; 4,4'methylenbis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5-triazine; di-n-octadecyl 3,5-di-tert-butyl-4-hydroxy-benzylphosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites. Particularly useful is distearylthiodipropionate. These stabilizers are generally present in amounts of about up to 2 weight percent, preferably 0.25 to 1.0%. It is also possible to add minor amounts (i.e. less than about 5% by weight of the formulation) of other diluents such as (1) waxes including petroleum waxes such as a paraffin wax having a melting point of from about 50 degrees C. to 75 degrees C. and microcrystalline wax having a melting point of from about 60 degrees to 90 degrees C.; the latter melting points being determined by ASTM method D127-60; (2) low molecular weight (600 to 3000) liquid polybutene; (3) polyethylene greases having a softening point of from about 80 degrees C. to 100 degrees C. and a hardness value, as determined by ASTM method D-1321, of from about 60 degrees C. to 120 degrees C.; (4) hydrogenated animal, fish and vegetable fats and oil such as hydrogenated tallow, lard, soya oil, cottonseed oil, castor oil, menhaden oil and cod liver oil; and (5) synthetic waxes made by polymerizing carbon monoxide and hydrogen, such as Fischer-Tropsch wax.

In addition, relatively small amounts (less than about 5%) of isotactic polypropylene may be employed as a reinforcing agent. Other additives such as flow modifiers, pigments, dyestuffs, etc., which are convlentionally added to hot melt adhesives for various end uses may also be incorporated in minor amounts into the formulations of the present invention.

Referring now to FIG. 3, an uninstalled drip plate assembly 46 is shown in detail. The drip plate 60, preferably constructed of stainless steel, Type 304SS, has a hot melt adhesive layer 62 on one surface thereof which, after removal of release sheet 64, is activated by being pressed onto the facing brick 20 of outer wythe 18. The adhesion of the drip plate to the brick, maintains the alignment of the masonry flashing system 10 components while the mortar is applied to the bed joint. On the remaining surface, the drip plate 60 also has another hot melt adhesive layer 66 which, after removal of release sheet 68, is activated by the polymeric membrane 42 being pressed thereon. Upon installation of the masonry flashing system 10, the drip plate 46 secures the edge of membrane 42 and ensures that water draining therefrom is directed to weep holes 40.

Figure 4:
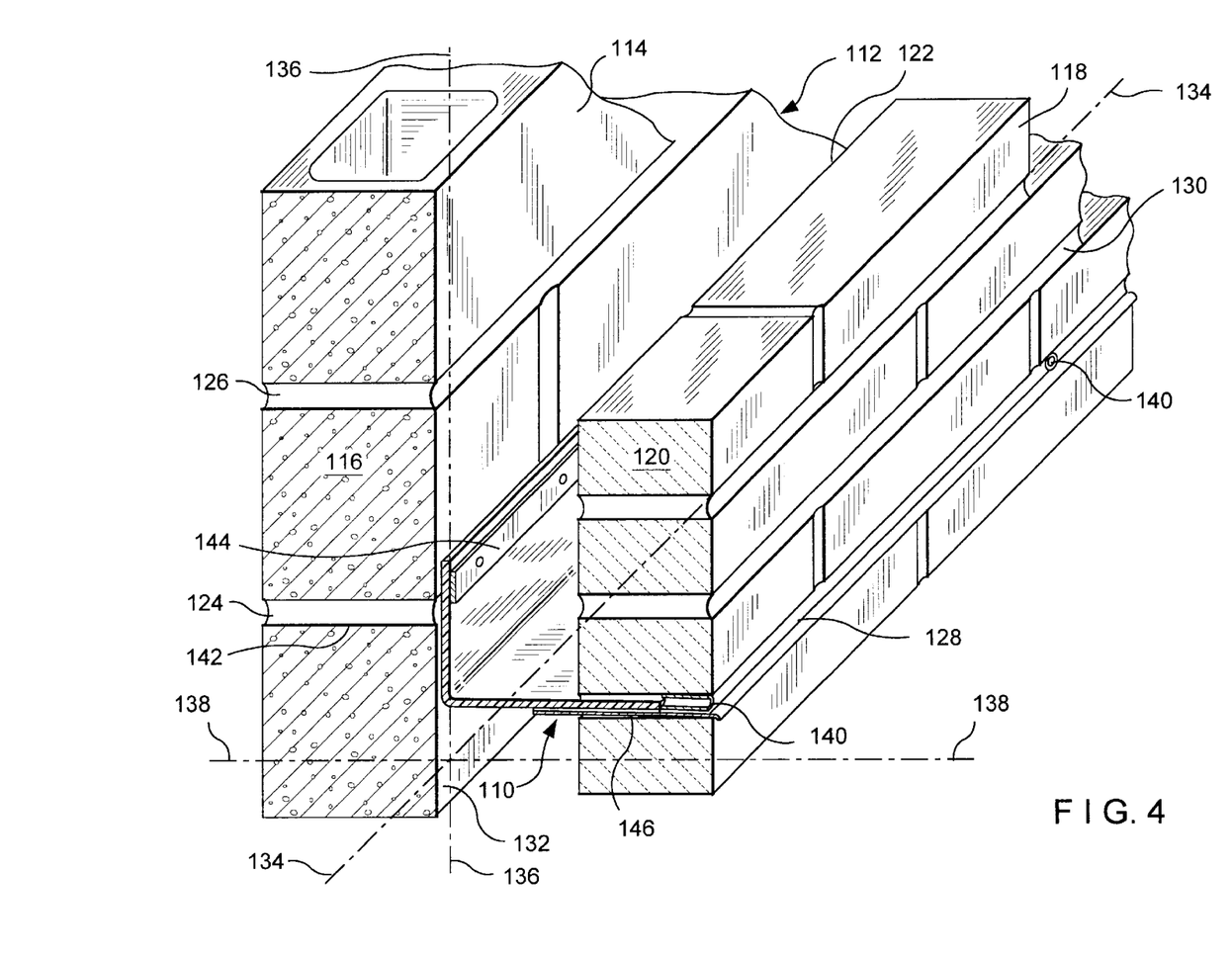
FIG. 4 is a perspective view of a second embodiment of a masonry flashing system of this invention and shows a wall with an interior wythe of masonry block and an exterior wythe of brick having a surface-mounted flashing system installed therein; and, FIG. 5 is a perspective view of the uninstalled peel-and-stick flashing membrane of FIG. 4, similar to FIG. 2 but having reinforcing fibers distributed throughout the carrier.
Figure 5:
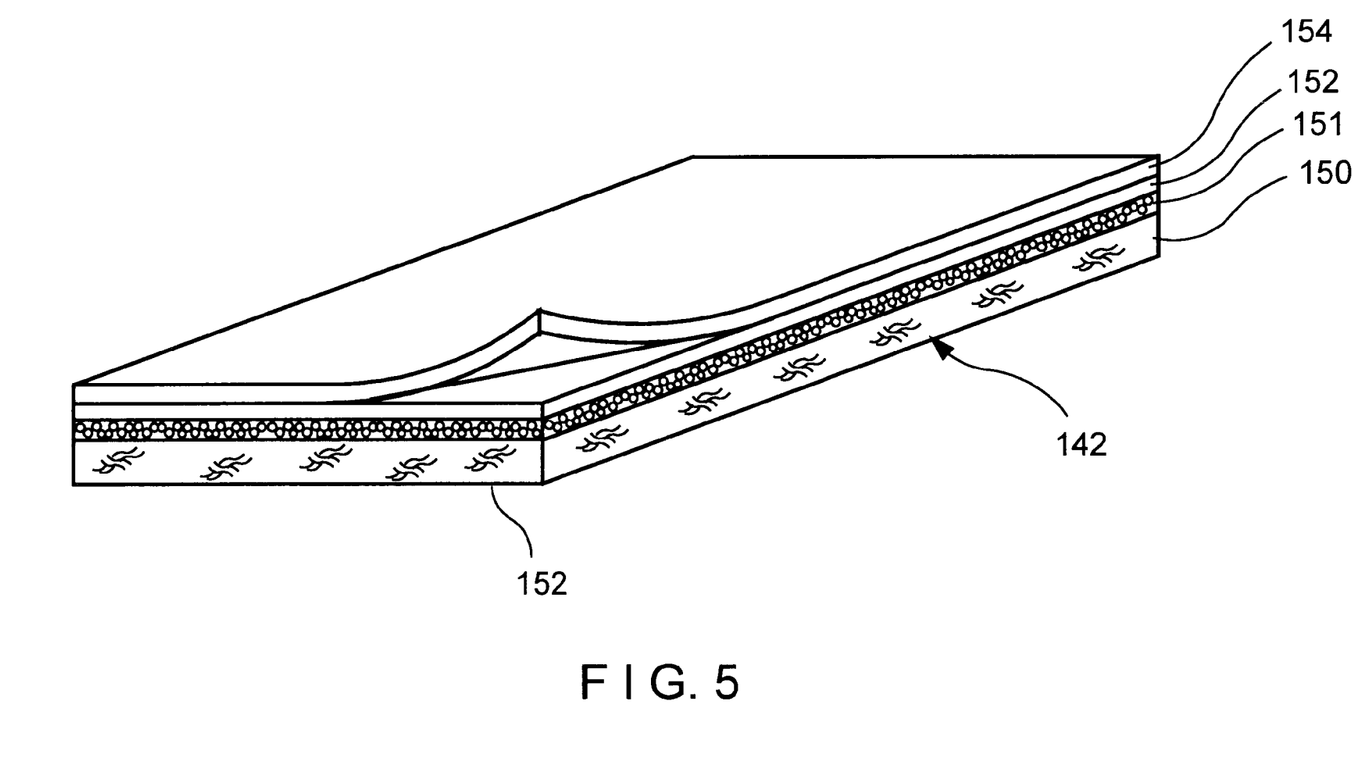

Referring now to FIGS. 4 and 5, a perspective view of the second embodiment of this invention in which a surface-mounted masonry flashing system, referred to generally by the reference designator 110, is shown. In this embodiment, similar parts to those of the first embodiment are referred to by reference designators 100 units higher than a similar part in the first embodiment. Thus, for example, the masonry block 16 in the first embodiment has an analogous masonry block 116 in the second embodiment. Here a cavity wall structure 112 is shown having an inner wythe 114 of masonry blocks 116 and an outer wythe 118 of facing brick 120. Between the inner wythe 114 and the outer wythe 118, a cavity 122 is formed. Successive bed joints 124 and 126 are formed between courses of blocks 116 and the joints are substantially planar and horizontally disposed. Also, successive bed joints 128 and 130 are formed between courses of bricks 120 and the joints are substantially planar and horizontally disposed. Selected bed joint 124 and bed joint 128 are constructed to align, that is to be substantially coplanar, the one with the other. For purposes of this discussion, the exterior surface 132 of the interior wythe 114 contains a horizontal line or x-axis 134 and an intersecting vertical line or y-axis. 136. A horizontal line or z-axis 138 also passes through the coordinate origin formed by the intersecting x- and y-axes. Frequently, the In the discussion which follows, it will be seen that the masonry flashing system 110 is constructed to completely seal the cavity and to drain water and water vapor therefrom through weep holes 40 that are in communication the flashing system 110.

Across the cavity of 122, in this embodiment, a surface-mounted installation of the masonry flashing system is shown. The system 110 includes a polymeric membrane or a composite elastomeric sheet 142 constructed for adherence to surface 132 in an x-y plane, for extending across and into bed joint 128 and an sealing cavity 122, and for embedment in bed joint 128 in an x-y plane. In this preferred mode, it is seen that the polymeric membrane 142 is installed behind termination bar 144 secured by attaching hardware 145. Between the membrane 142 and the brick 120, a drip plate 146, preferably of stainless steel, is constructed to improve the communication between the masonry flashing system 110 and weep holes 140.

Referring now to FIG. 5 the peel-and-stick polymeric membrane 142 of this embodiment is shown in greater detail. The membrane 142 is comprised of an elastomeric sheet or carrier 150 into which is admixed filamentous material 152. The admixture of the filamentous material 152 is constructed to enhance the tear and puncture resistance of the overall composite.

Throughout the flashing system described herein, a polymeric foam lamina or layer 151 is optionally employed to enhance the sealing between the system and the cavity wall components. While this is not generally applicable to vertical surfaces, in those applications in which the brick of the outer wythe is of a particularly rough texture, a foam layer is placed between the drip plate 146 and the brick surface. This has been found to enhance the sealing of the cavity. Suitable polymeric foams include both cross-linked and non-cross-linked polyethylene and closed-cell neoprene sponge.

Because of environmental and flammability concerns with traditional solvent-based adhesives and an invested position in bitumen-containing materials, the building construction industry has been slow to adopt hot melt adhesive compositions for masonry flashing applications. Now, with the recent advances in hot melt adhesives technology incorporated into the above application advantages over solvent-based or bitumen systems are created hereby. Thus, because the polymeric membranes described above have the requisite tear and puncture resistance and the hot melt adhesives meet the fire retardancy and adhesiveness requirements, the previous barriers to use have been removed. It is further appreciated that the advance in the art is remarkable as the hot melt adhesives hereof do not contain organic solvents and thereby do not cause the environmental concerns of the solvent-based systems. The masonry flashing system of this invention exhibits temperature stability superior to that of bitumen materials and do not break down at high ambient temperatures. In addition, as hot melt adhesives are pressure activated, they set up immediately and reduce the time required for installation. Thus, the bonding of hot melt adhesives to masonry surfaces is immediate and unlike bitumen materials are not dependent on ambient temperatures for cure purposes. This translates into greater quality construction and easier assurance thereof. Another advantage of hot melt adhesives is their economy and applicability to peel-and-stick structures.

What is claimed is:

1. A peel-and-stick laminate for flashing of a masonry cavity wall with masonry block components said peel-and-stick laminate comprising:
    a first elastomeric sheet having two major surfaces;
    a fibrous reinforcing mat mounted on one surface of said first elastomeric sheet;
    a second elastomeric sheet mounted to laminate said fibrous reinforcing mat between said first and said second elastomeric sheet;
    a hot melt adhesive layer on said first elastomeric sheet mounted on the surface opposite said fibrous reinforcing, said hot melt adhesive adapted by having sufficient tack to durably adhere to the surface of said masonry block; and,
    a release sheet adhered to said hot melt adhesive layer, said release sheet being removable prior to mounting said peel-and-stick laminate.

2. A peel-and-stick laminate as described in claim 1, wherein said hot melt adhesive comprises about 10 to 50 percent by weight of an isotactic thermoplastic, about 5.5 to 10 percent by weight of ethylene, about 20 to 50 percent of a tackifier resin; 15 to 50 percent by weight of an amorphous diluent; 0 to 2 percent by weight of a stabilizer; and 0 to 5 percent by weight of wax.

3. A peel-and-stick laminate as described in claim 2 wherein said tackifier resin is selected from a group consisting of hydrogenated wood rosin, rosin ester, polyterpene resins, and aliphatic petroleum hydrocarbon resins.

4. A peel-and-stick laminate as described in claim 2 wherein said isotactic thermoplastic is a mixture of polybutylene copolymers.

5. A peel-and-stick laminate as described in claim 2 wherein said polybutylene copolymers are polybutene and ethylene copolymer.

6. A peel-and-stick laminate as described in claim 2 wherein said hot melt adhesive is APC #915.

7. A peel-and-stick laminate as described in claim 1 wherein said fibrous reinforcing mat is selected from a group consisting of a woven technical textile, a nonwoven technical textile, and a filamentous fibrous mass.

8. A peel-and-stick laminate as described in claim 1 wherein said peel-off sheet is selected from a group consisting of film, foil, and paper.

9. A masonry flashing system for flashing of a masonry cavity wall with an inner wythe of masonry block and an outer wythe of brick with weep holes therethrough, said inner wythe and said outer wythe having a cavity therebetween, said masonry flashing system comprising, in combination:
    an elastomeric laminate having a reinforced body with two major surfaces;
    a first hot melt adhesive layer on said elastomeric laminate, said hot melt adhesive adapted by having sufficient tack to durably adhere upon pressure activation to the surface of said masonry block;
    a first release sheet adhered to said first hot melt adhesive layer, said first release sheet being removable prior to mounting said elastomeric laminate; and,
    a drip plate dimensioned for deposition on said brick and to extend from said cavity and beyond the outer surface thereof.

10. A masonry flashing system as described in claim 9 wherein said drip plate has two major surfaces and further comprises:
    a second hot melt adhesive layer on the lower surface of said drip plate, said hot helt adhesive adapted by having sufficient tack to sealingly adhere upon pressure activation to the surface of said brick;
    a second release sheet adhered to said second hot melt adhesive layer, said second release sheet being removable prior to mounting said drip plate;
    whereby, upon mounting said drip plate to said outer wythe, the drip plate maintains alignment.

11. A masonry flashing system as described in claim 9 wherein said drip plate has two major surfaces and further comprises:
    a resilient layer of foam polymeric material mounted on the lower surface of said drip plate;
    a second hot melt adhesive layer on the lower surface of said resilient layer, said hot helt adhesive adapted by having sufficient tack to sealingly adhere upon pressure activation to the surface of said brick;
    a second release sheet adhered to said second hot melt adhesive layer, said second release sheet being removable prior to mounting said drip plate;
    whereby, upon mounting said drip plate to said outer wythe, the drip plate maintains alignment.

12. A masonry flashing system as described in claim 11 wherein said foam polymeric material is selected from a group consisting of cross-linked polyethylene, non-cross-linked polyethylene, and closed-cell neoprene sponge.

13. A masonry flashing system as described in claim 9 wherein said elastomeric laminate further comprises:
    a first elastomeric sheet having two major surfaces;
    a fibrous reinforcing mat mounted on one surface of said first elastomeric sheet; and a second elastomeric sheet mounted to laminate said fibrous reinforcing mat between said first and said second elastomeric sheet.

14. A masonry flashing system for flashing of a masonry cavity wall with an inner wythe of masonry block and an outer wythe of brick with weep holes therethrough, said inner wythe and said outer wythe having a cavity therebetween, said masonry flashing system comprising, in combination:

a peel-and-stick laminate, in turn, comprising:
  a first elastomeric sheet having two major surfaces;
  a fibrous reinforcing mat mounted on one surface of said first elastomeric sheet;
  a second elastomeric sheet mounted to laminate said fibrous reinforcing mat between said first and said second elastomeric sheet;
  a hot melt adhesive layer on said first elastomeric sheet mounted on the surface opposite said fibrous reinforcing, said hot melt adhesive adapted by having sufficient tack to durably adhere to the surface of said masonry block;
  a release sheet adhered to said hot melt adhesive layer, said release sheet being removable prior to mounting said peel-and-stick laminate; and,
  a drip plate dimensioned for deposition on said brick and to extend into said cavity.

15. A masonry flashing system as described in claim 14, wherein said drip plate has two major surfaces, said drip plate further comprises:
  a hot melt adhesive layer on one major surface thereof, said hot melt adhesive adapted by having sufficient tack to durably adhere to the surface of said brick; and,
  a release sheet adhered to said hot melt adhesive layer, said release sheet being removable prior to mounting said drip plate.

* * * * *